(12) United States Patent
Byun

(10) Patent No.: US 10,126,588 B2
(45) Date of Patent: Nov. 13, 2018

(54) LIQUID CRYSTAL DISPLAY DEVICE WITH PROTRUSTIONS FORMING A SPACER

(71) Applicant: LG Display Co., Ltd., Seoul (KR)

(72) Inventor: Woo-Jung Byun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/282,748

(22) Filed: Sep. 30, 2016

(65) Prior Publication Data

US 2017/0097542 A1  Apr. 6, 2017

(30) Foreign Application Priority Data

Oct. 2, 2015 (KR) .................. 10-2015-0138915

(51) Int. Cl.
| | |
|---|---|
| G02F 1/1335 | (2006.01) |
| G02F 1/1339 | (2006.01) |
| G02F 1/1341 | (2006.01) |
| G02F 1/1362 | (2006.01) |
| G02F 1/1368 | (2006.01) |
| G02F 1/1365 | (2006.01) |

(Continued)

(52) U.S. Cl.
CPC ...... *G02F 1/133514* (2013.01); *G02F 1/1341* (2013.01); *G02F 1/1368* (2013.01); *G02F 1/13394* (2013.01); *G02F 1/133512* (2013.01); *G02F 1/133516* (2013.01); *G02F 1/136286* (2013.01); *G02F 2001/133519* (2013.01); *G02F 2001/136295* (2013.01); *G02F 2201/121* (2013.01); *G02F 2201/50* (2013.01); *G02F 2201/52* (2013.01)

(58) Field of Classification Search
CPC combination set(s) only.
See application file for complete search history.

(56) References Cited

U.S. PATENT DOCUMENTS 6,297,867 B1 * 10/2001 Miyahara .............. G02F 1/1345
349/141
6,671,025 B1 * 12/2003 Ikeda ................ G02F 1/133514
349/106

(Continued)

FOREIGN PATENT DOCUMENTS

| CN | 204462602 U | 7/2015 |
|---|---|---|
| TW | 201344314 A | 11/2013 |

*Primary Examiner* — Lauren Nguyen
(74) *Attorney, Agent, or Firm* — Birch, Stewart, Kolasch & Birch, LLP

(57) ABSTRACT

A display device can include a thin-film transistor (TFT) array substrate having data lines, gate lines, TFTs formed at intersections of the data and gate lines, a protective layer disposed on the gates lines and the data lines, and a first protrusion protruding from the protective layer. Also, the display device can include a color filter array substrate having first, second and third color filter layers corresponding to first, second and third sub-pixels, respectively, in which overlapping portions among the first, second and third color filer layers include at least two of the first, second and third color filer layers overlapping with each other, and a section of the overlapping portions among the first, second and third color filer layers of the color filter array substrate forms a second protrusion, and the second protrusion overlaps with the first protrusion protruding from the protective layer of the TFT array substrate.

19 Claims, 9 Drawing Sheets

(51) Int. Cl.
*G02F 1/01* (2006.01)
*G02F 7/00* (2006.01)

(56) References Cited

U.S. PATENT DOCUMENTS

| | | | |
|---|---|---|---|
| 2009/0167996 A1* | 7/2009 | Takahashi | G02F 1/133512 349/106 |
| 2010/0020275 A1* | 1/2010 | Mima | G02F 1/133514 349/106 |
| 2011/0109851 A1* | 5/2011 | Ono | G02F 1/133514 349/106 |
| 2014/0176885 A1* | 6/2014 | Okita | G02F 1/133512 349/106 |

* cited by examiner

FIG. 8
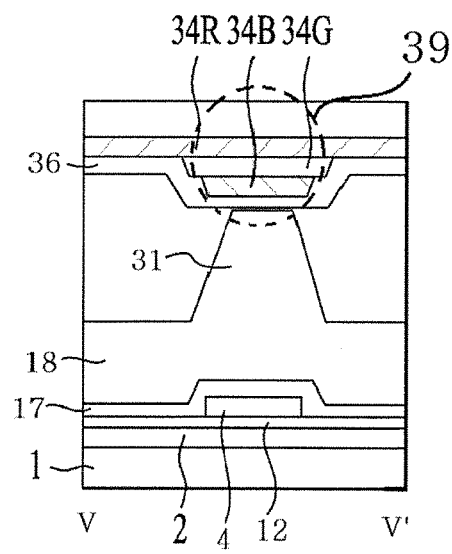
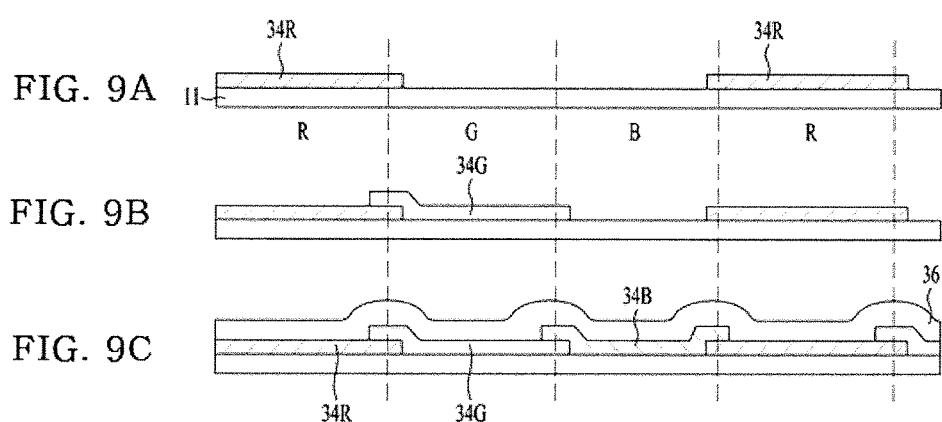
FIG. 9A
FIG. 9B
FIG. 9C

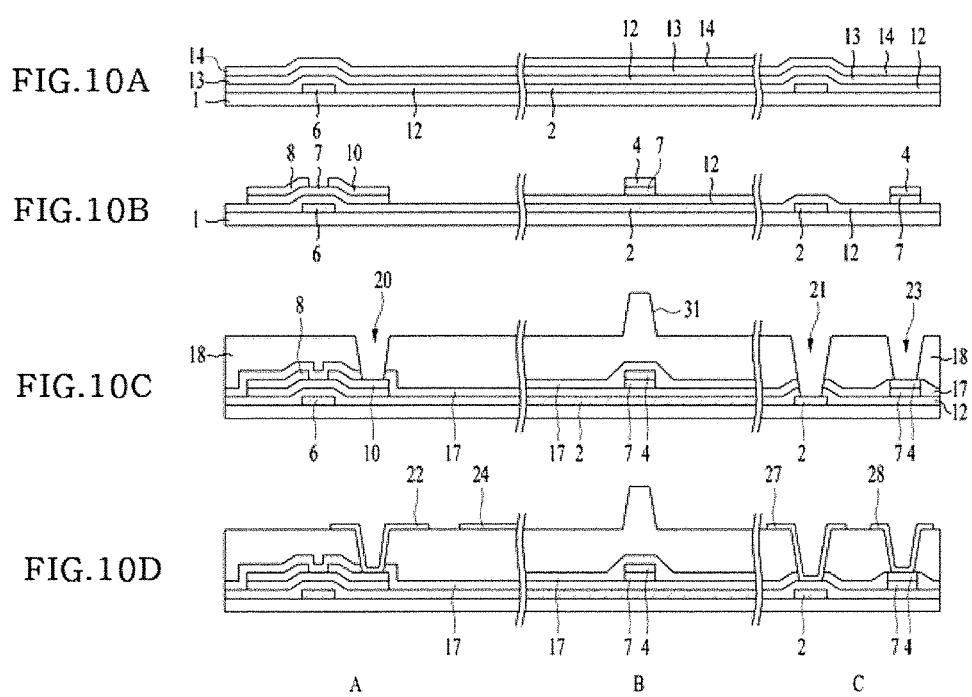

US 10,126,588 B2

LIQUID CRYSTAL DISPLAY DEVICE WITH PROTRUSTIONS FORMING A SPACER

CROSS-REFERENCE TO RELATED APPLICATIONS

This application claims the priority benefit of the Korean Patent Application No. 10-2015-0138915, filed in the Republic of Korea on Oct. 2, 2015, which is hereby incorporated by reference as if fully set forth herein.

BACKGROUND OF THE INVENTION

Field of the Invention

The present invention relates to a liquid crystal display device and a method of manufacturing the same, and more particularly, to a liquid crystal display device capable of reducing the number of processing masks without forming a separate column spacer, and a method of manufacturing the same.

Discussion of the Related Art

Generally, liquid crystal display devices display images by adjusting light transmittance of a liquid crystal screen using an electric field. Such liquid crystal display devices are mainly divided into horizontal electric field applying type liquid crystal display devices and vertical electric field applying type liquid crystal display devices, depending on a direction of the electric field used to drive the liquid crystal screen.

A vertical electric field applying type liquid crystal display device includes a common electrode formed on an upper substrate and a pixel electrode formed on a lower substrate, and thus enables a liquid crystal panel of a twisted nematic (TN) mode to be driven due to a vertical electric field formed between the common electrode and the pixel electrode since the common electrode and the pixel electrode are disposed to face each other. Such the liquid crystal display device has an advantage in that the liquid crystal display device has a high aperture ratio, but has a drawback in that the liquid crystal display device has a narrow viewing angle.

A horizontal electric field applying type liquid crystal display device enables a liquid crystal panel of an in-plane switch (hereinafter referred to as 'IPS') mode to be driven due to a horizontal electric field formed between a common electrode and a pixel electrode disposed side by side on a lower substrate. Such the liquid crystal display device has an advantage in that the liquid crystal display device has a wide viewing angle.

Hereinafter, a related art horizontal electric field applying type liquid crystal display device will be described in detail. FIG. 1 is a perspective view illustrating a liquid crystal display panel of a horizontal electric field applying type, FIG. 2 is a plan view schematically illustrating a thin-film transistor array substrate shown in FIG. 1, and FIG. 3 is a cross-sectional view illustrating the liquid crystal display panel shown in FIG. 1.

As shown in FIG. 1, the related art horizontal electric field applying type liquid crystal display device includes a thin-film transistor array substrate 50, a color filter array substrate 60, and a liquid crystal layer 40 filled in a space between the thin-film transistor array substrate 50 and the color filter array substrate 60. Here, the thin-film transistor array substrate 50 and the color filter array substrate 60 have a predetermined space formed by a column spacer 70 interposed therebetween, and are bonded to face each other.

As shown in FIGS. 2 and 3, the thin-film transistor array substrate 50 includes a plurality of gate lines 2 and a plurality of data lines 4 formed crosswise on the lower substrate 1 to define a plurality of pixel regions, a thin-film transistor 30 formed at each of intersections of the plurality of gate lines 2 and the plurality of data lines 4, pixel and common electrodes 22 and 24 formed at each of the pixel regions to form a horizontal electric field, and a common line 26 connected to the common electrode 24.

The gate lines 2 serve to supply a gate signal to the gate electrode 6 of each of the thin-film transistors 30, the data lines 4 serve to supply a data signal to a pixel electrode 22 via each of the thin-film transistors 30. The common line 26 is formed side by side with the gate lines 2, with the pixel region interposed therebetween, to apply a reference voltage for driving a liquid crystal panel to the common electrode 24.

The thin-film transistor 30 charges the pixel electrode 22 with the data signal from the data lines 4 in response to the gate signal from the gate lines 2 so that the pixel electrode 22 is maintained in a charged state. For this purpose, the thin-film transistor 30 includes a gate electrode 6 connected to each of the gate lines 2, a source electrode 8 connected to each of the data lines 4, and a drain electrode 10 connected to the pixel electrode 22.

In addition, the thin-film transistor 30 further includes an active layer including a channel region formed between the source electrode 8 and the drain electrode 10 while overlapping each other with the gate electrode 6 and the gate insulating layer 12 interposed therebetween.

The pixel electrode 22 is connected to the drain electrode 10 of the thin-film transistor 30 via a contact hole 20 formed through a protective layer 18 and is formed on the pixel region. In particular, the pixel electrode 22 is formed between the common electrodes 24 so that the pixel electrode 22 is arranged side by side with the common electrodes 24.

The common electrode 24 is connected to the common line 26, and formed on the pixel region. In particular, the common electrode 24 is formed on the pixel region to be parallel to the pixel electrode 22.

As shown in FIG. 3, the color filter array substrate 60 includes a color filter layer 34 formed on the upper substrate 11 to realize colors for the respective pixel regions, a black matrix layer 32 for preventing light leakage from boundaries of the respective pixel regions, an overcoat layer 36 for planarizing the upper substrate 11 having the color filter layer 34 and the black matrix layer 32 formed therein, and a column spacer 70 for constantly maintaining a cell gap on the overcoat layer 36.

Therefore, a horizontal electric field is formed between the pixel electrode 22 supplied with the data signal via the thin-film transistor 30 and the common electrode 24 supplied with the reference voltage via the common line 26. Liquid crystal molecules of the liquid crystal layer 40 filled between the thin-film transistor array substrate 50 and the color filter array substrate 60 rotates with dielectric anisotropy due to such a horizontal electric field. Transmittance of light transmitting the pixel region varies according to a degree of rotation of the liquid crystal molecules, thereby realizing an image.

Nine masks are required to manufacture such the related art liquid crystal display device.

Therefore, the related art liquid crystal display device has a drawback in that processes are complicated and manufacturing costs increase since the black matrix layer and the column spacer are formed and the 9 masks are used. In addition, the related art liquid crystal display device has a drawback in that an amount of liquid crystals used increases as a planarization process is performed using the overcoat layer.

In the related art horizontal electric field applying type liquid crystal display devices, a method in which a stacked body obtained by stacking color filter layers is used instead of a column spacer without separately forming the column spacer (see Korean Patent Application Publication No. 1996-0005176) has been developed. Also, a method in which a protective layer having a step coverage is used instead of a column spacer (see Korean Patent application Publication No. 2005-0053288) has been developed.

However, such related art methods have a drawback in that no column spacer is substantially formed.

First, when the column spacer is formed using the color filter layer as described in Korean Patent application Publication No. 1996-0005176, problems occur accordingly, as will described below.

Generally, since a liquid crystal display device having a cell gap of approximately 2.8 µm to 3.0 µm is required, and a threshold value (CD) of a column spacer functions as a frictional force with respect to the mobility of liquid crystals, the column spacer should be formed to a size of 10 µm to 15 µm.

However, when the column spacer is formed of a pigment of the color filter layer, a pattern having a thickness of approximately 20 µm or less may not be formed due to limitations of pigments in forming the pattern. In addition, when the color filter layers are stacked to form a column spacer, and an overcoat layer is formed on the stacked color filter layers, uniformity of the column spacer may be dramatically degraded.

That is, color filter layers should be formed on each pixel region by respectively depositing pigments of respective R, G and B color filter layers in a thickness of approximately 2 to 2.4 µm. The pigments of respective R, G and B color filter layers should be stacked on boundaries of the respective pixel regions to form a column spacer having a step coverage of approximately 3.5 µm so as to achieve a cell gap of approximately 2.8 µm to 3.0 µm. And an overcoat layer should be formed on the column spacer and the color filter layers to prevent eruption of the pigments of the color filter layers. But, the step coverage of the column spacer decreases by approximately 1 to 1.5 µm due to planarization characteristics of the overcoat layer material. As a result, the finally formed column spacer has a step coverage of approximately 2 to 2.5 µm. Therefore, the overcoat layer may not serve as the column spacer, and the uniformity of the column spacer may also be dramatically degraded.

Second, when the column spacer is formed using the protective layer as described in Korean Patent Application Publication No. 10-2005-0053288, problems occur accordingly, as will described below.

In the liquid crystal display device as described above, the organic protective layer should be deposited to a thickness of approximately 6.5 µm to have a desired cell gap of approximately 2.8 µm to 3.0 µm.

That is, the thickness of the organic protective layer serving as a low dielectric is required to be greater than or equal to approximately 2.0 µm, the step coverage of the column spacer is required to be approximately 3.5 µm to have a cell gap of approximately 2.8 µm to 3.0 µm, and a thickness of the organic protective layer which is lost when the organic protective layer is etched to form gate line pad contact holes, data line pad contact holes, and source/drain contact holes is in a range of approximately 0.8 µm to 1.0 µm. Therefore, the organic protective layer should be deposited to a thickness of approximately 6.5 µm to form a column spacer using the organic protective layer.

However, the organic protective layer can be coated to a thickness of up to 6 µm using existing techniques, and the substantial thickness of the organic protective layer is in a range of approximately 3 µm to 4 µm for the liquid crystal display devices produced so far.

In addition, when the organic protective layer is formed to a thickness of 6 µm or more, and gate line pad contact holes, data line pad contact holes and source/drain contact holes are formed using a half-tone mask, threshold values of the contact holes may be significantly lowered, compared to when the organic protective layer may be formed to a thickness of approximately 3 µm to 4 µm to form the contact holes, which results in loose contact between layers.

Third, when the color filter layers are stacked to form the column spacer, or the organic protective layer is etched to form the column spacer as described above, the column spacer moves due to bending of a liquid crystal display panel. In this instance, scratches may occur on an alignment film formed between facing substrates as the column spacer is moving.

When the scratches occur on the alignment film as described above, light leakage into a region other than a black matrix layer may occur, resulting in a red-eye effect.

SUMMARY OF THE INVENTION

Accordingly, the present invention is directed to a liquid crystal display device and a method of manufacturing the same that substantially obviates one or more problems due to limitations and disadvantages of the related art.

An object of the present invention is to provide a liquid crystal display device capable of reducing the number of processing masks without forming a separate column spacer and black matrix layer, and a method of manufacturing the same.

To achieve these and other advantages and in accordance with the purpose of the present invention, as embodied and broadly described herein, the present invention can provide in one aspect a display device including a thin-film transistor (TFT) array substrate having data lines, gate lines, TFTs formed at intersections of the data and gate lines, a protective layer disposed on the gates lines and the data lines, and a first protrusion protruding from the protective layer. Also, the display device can include a color filter array substrate having first, second and third color filter layers corresponding to first, second and third sub-pixels, respectively, in which overlapping portions among the first, second and third color filer layers include at least two of the first, second and third color filer layers overlapping with each other, and a section of the overlapping portions among the first, second and third color filer layers of the color filter array substrate forms a second protrusion, and the second protrusion overlaps with the first protrusion protruding from the protective layer of the TFT array substrate.

In another aspect, the present invention can provide a method for manufacturing a display device that includes forming a thin-film transistor (TFT) array substrate including a plurality of data lines, a plurality of gate lines, a plurality of TFTs at intersections of the data lines and the gate lines, and a protective layer on the gates lines and the data lines, the protective layer including a first protrusion protruding from the protective layer; and forming a color filter array substrate including: first, second and third color filter layers corresponding to first, second and third sub-pixels, respectively, in which a second protrusion is formed by overlapping at least two of the first, second and third color filer layers with each other; and overlapping the first protrusion with the second protrusion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a cross-sectional view taken along line V-V' shown in FIG. 5;

FIG. 9A to 9C are process cross-sectional views illustrating a color filter array substrate of the liquid crystal display device according to one embodiment of the present invention; and FIG. 10A to 10D are process cross-sectional views illustrating a thin-film transistor array substrate 50 of the liquid crystal display device according to one embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A liquid crystal display device having above-described characteristics and effects according to embodiments of the present invention, and a method of manufacturing the same will be described in further detail with reference to the accompanying drawings.

Figure 1:
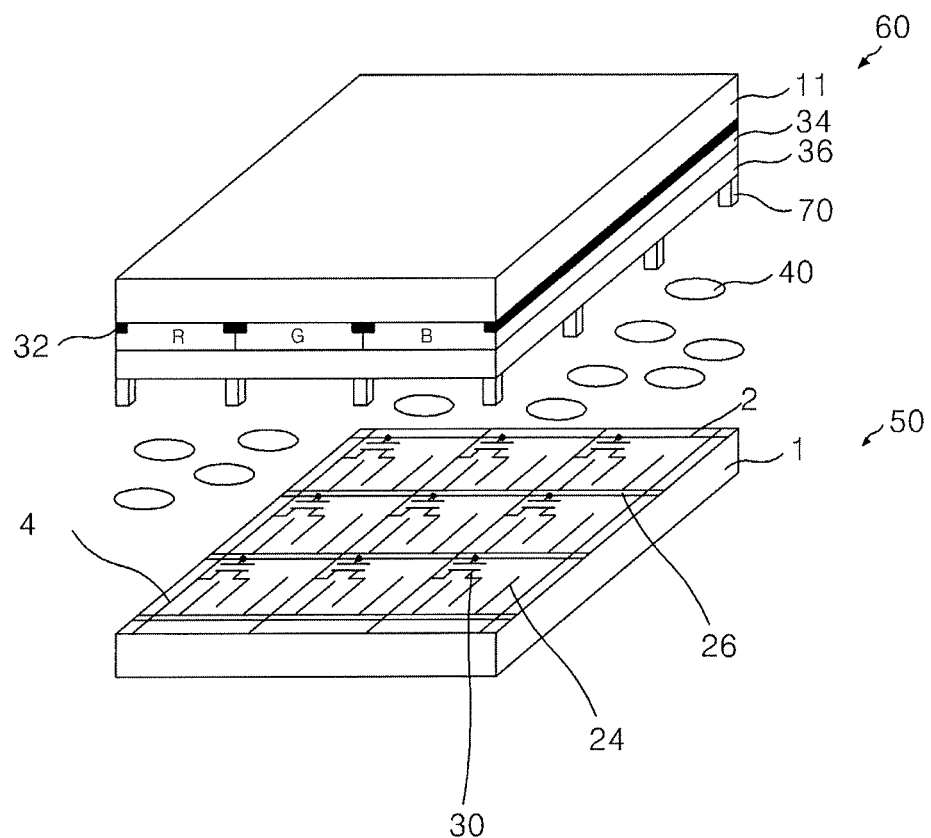
FIG. 1 is a perspective view illustrating a related art liquid crystal display panel of a horizontal electric field applying type.
Figure 2:
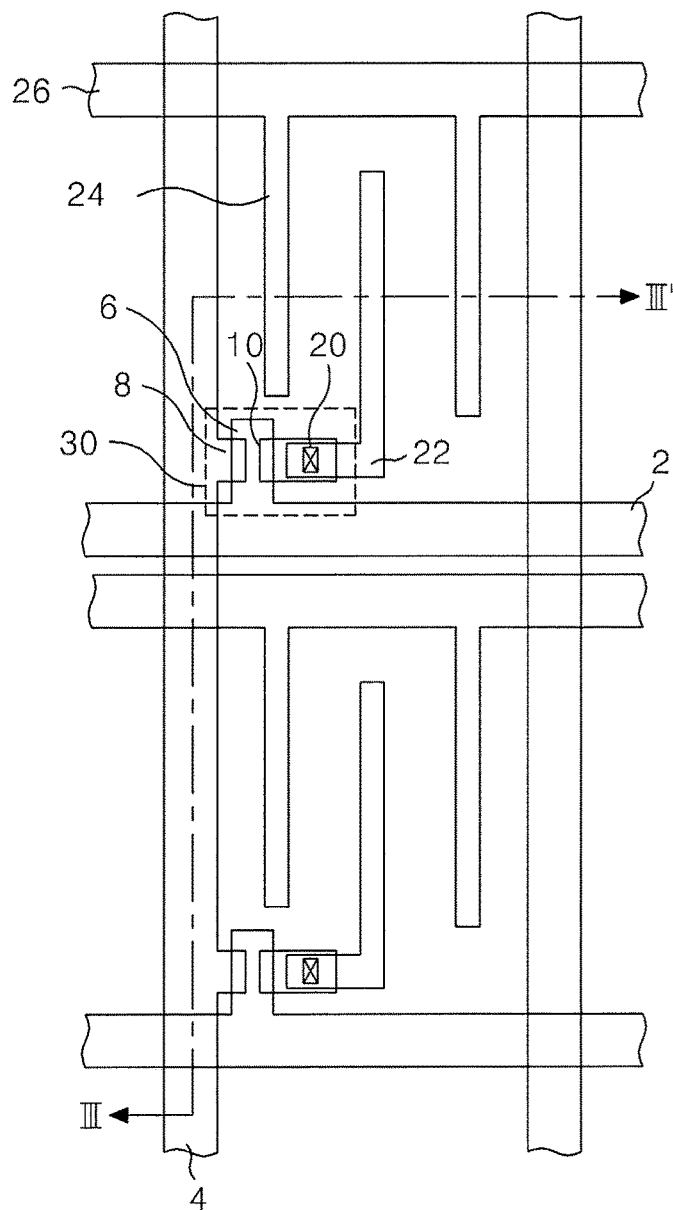
FIG. 2 is a plan view schematically illustrating a thin-film transistor array substrate shown in FIG. 1.
Figure 3:
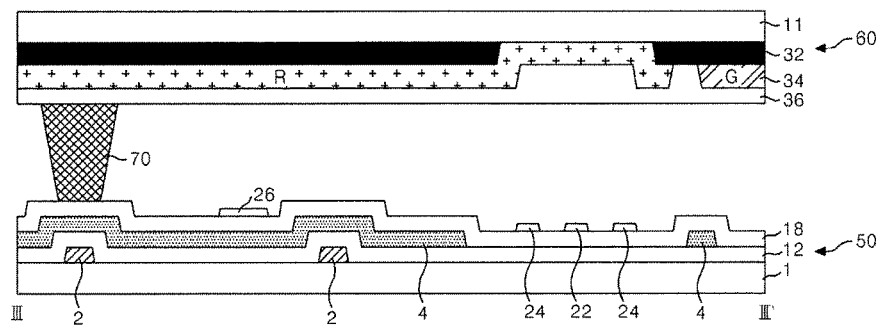
FIG. 3 is a sectional view illustrating the liquid crystal display panel shown in FIG. 1.

Similar to the related art example shown in FIG. 1, the liquid crystal display device according to one embodiment of the present invention includes a thin-film transistor array substrate 50, a color filter array substrate 60, and a liquid crystal layer 40 filled in a space between the thin-film transistor array substrate 50 and the color filter array substrate 60.

Figure 4:
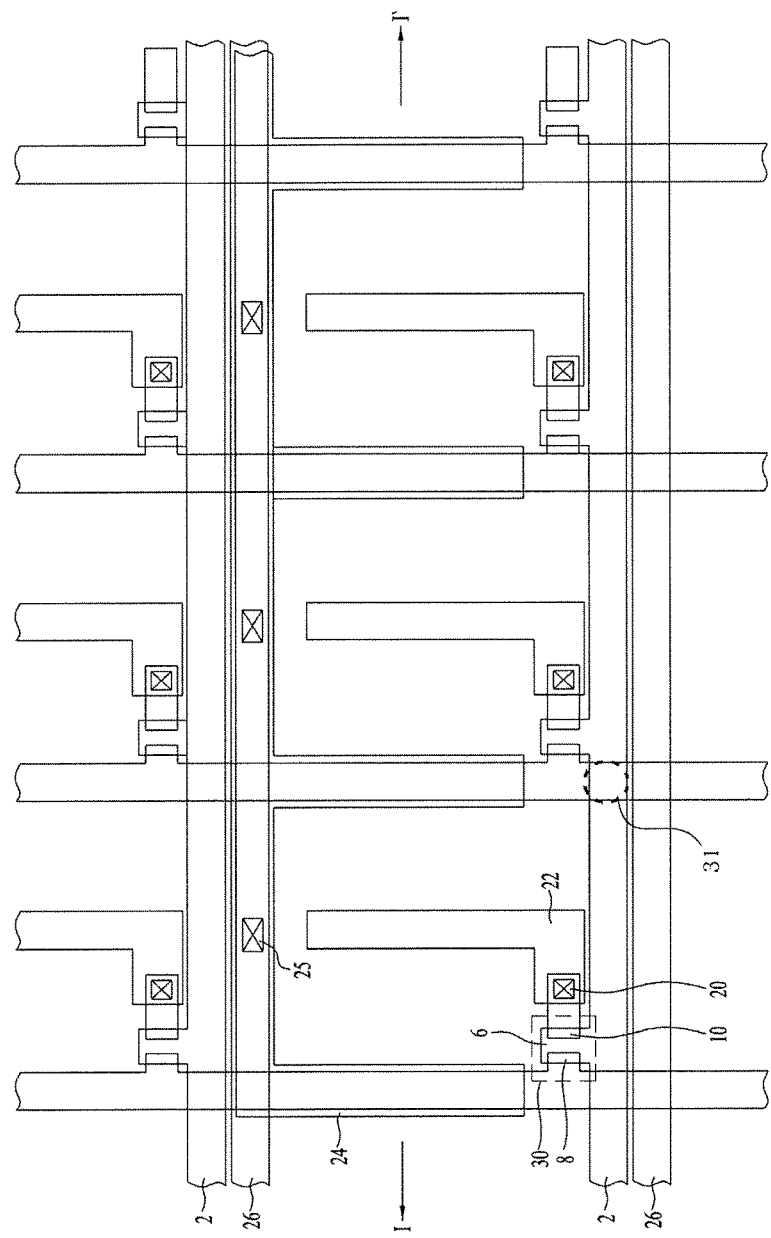
FIG. 4 is a layout diagram illustrating the thin-film transistor array substrate in the liquid crystal display device according to one embodiment of the present invention.
Figure 5:
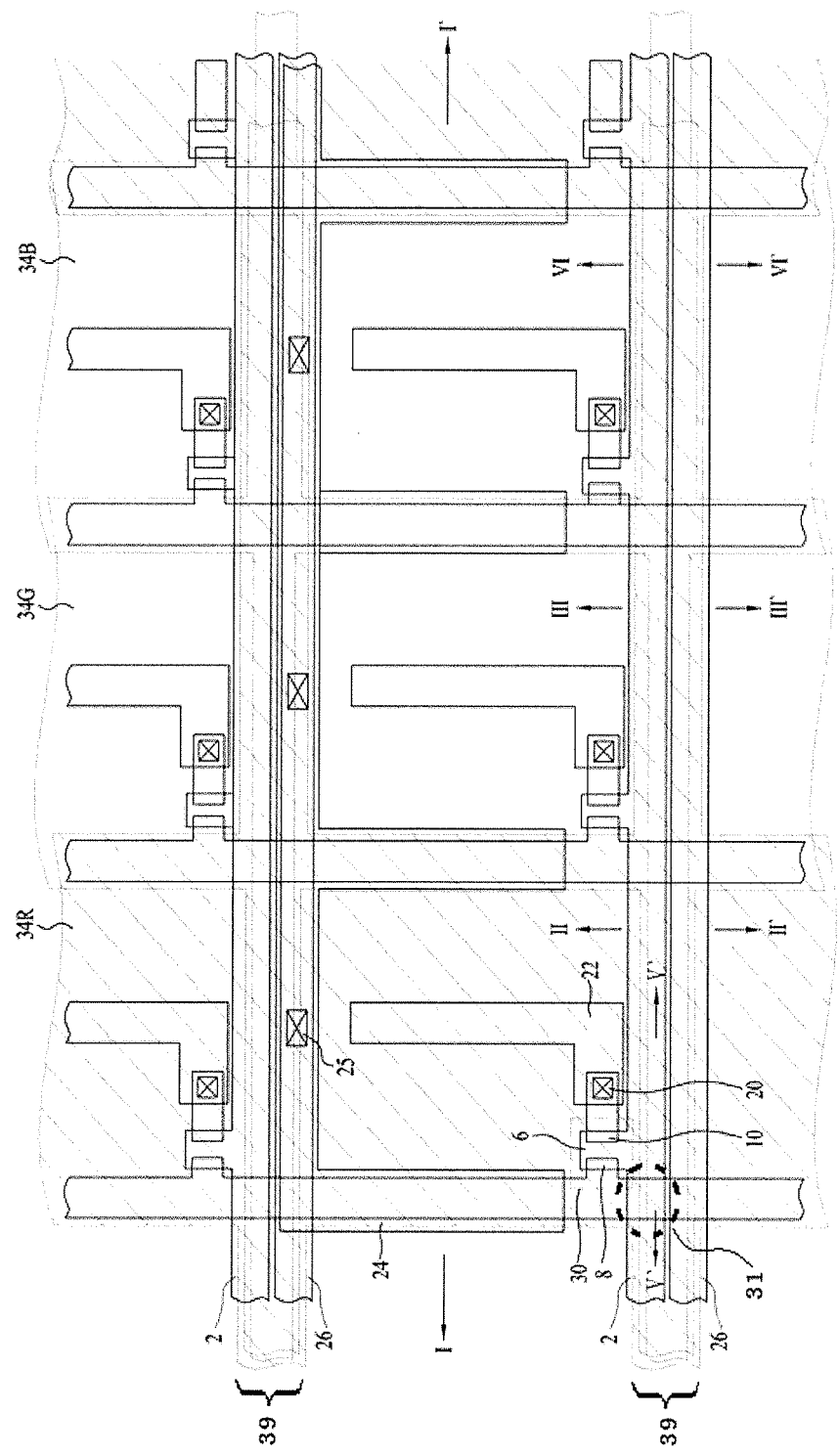
FIG. 5 is a layout diagram illustrating a color filter array substrate in the liquid crystal display device according to one embodiment of the present invention.
Figure 6:
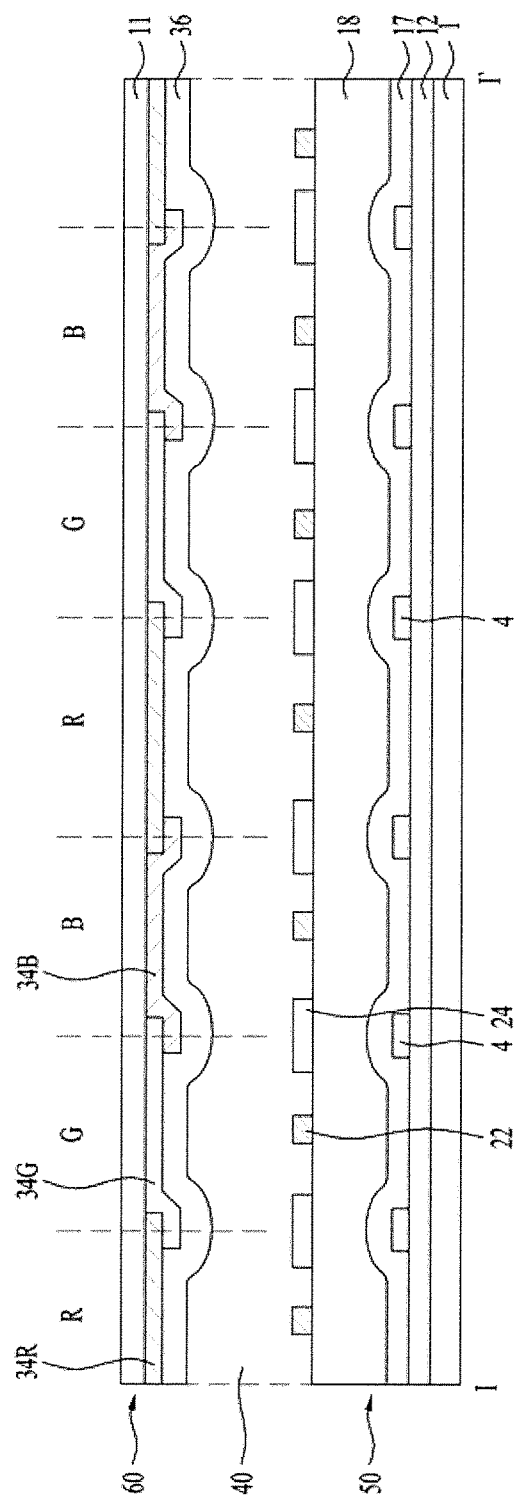
FIG. 6 is a cross-sectional view taken along line I-I' shown in FIG. 5.
Figure 7:
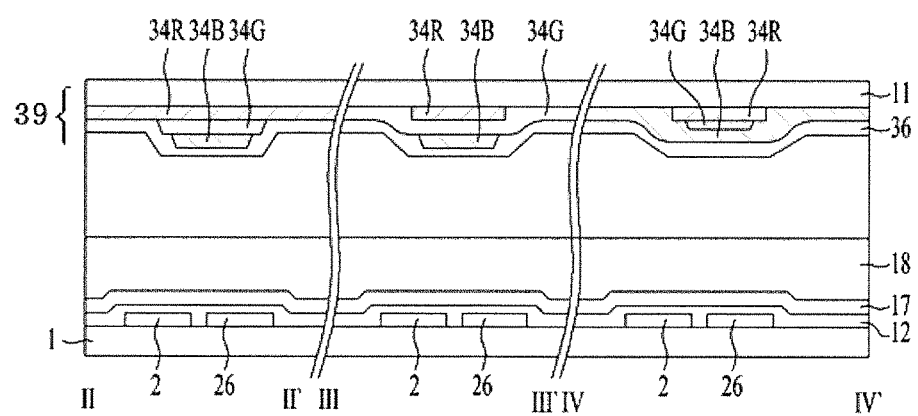
FIG. 7 is a cross-sectional view taken along lines and IV-IV' shown in FIG. 5.

FIG. 4 is a layout diagram showing a thin-film transistor array substrate of the liquid crystal display device according to one embodiment of the present invention, FIG. 5 is a layout diagram showing a color filter array substrate of the liquid crystal display device according to one embodiment of the present invention, FIG. 6 is a cross-sectional view taken along line I-I' shown in FIG. 5, FIG. 7 is a cross-sectional view taken along lines II-II', III-III' and IV-IV' shown in FIG. 5, and FIG. 8 is a cross-sectional view taken along line V-V' shown in FIG. 5.

In the liquid crystal display device according to one embodiment of the present invention, the thin-film transistor array substrate 50 includes a lower substrate 1, and a plurality of gate lines 2 and a plurality of common lines 26 formed on the lower substrate 1, as shown in FIGS. 4, 6 and 7. The plurality of gate lines 2 and the plurality of common lines 26 are adjacent to each other, formed parallel to each other, and formed of the same material in the same layer. Each of the gate lines 2 includes a gate electrode 6 protruding therefrom.

A gate insulating layer 12 is formed on an entire surface of the lower substrate 1 including the plurality of gate lines 2 and the plurality of common lines 26.

A plurality of data lines 4 defining a plurality of pixel regions together with the plurality of gate lines are arranged on the gate insulating layer 12 so that the plurality of data lines 4 are intersected with the plurality of gate lines 2.

A thin-film transistor 30 is formed at each of intersections of the gate lines 2 and the data lines 4.

The thin-film transistor 30 includes the gate electrode 6 connected to the gate lines 2, the gate insulating layer 12 formed on the entire surface of the lower substrate 1, an active layer (e.g., see reference number 7 of FIG. 10) formed on the gate insulating layer 12 over the gate electrode 6, a source electrode 8 connected to the data lines 4 to overlap one side of the active layer, and a drain electrode 10 opposite to the source electrode 8 to overlap the other side of the active layer.

An interlayer insulation layer 17 is formed on an entire surface of the lower substrate 1 including the thin-film transistor 30 and the data lines 4, and a protective layer 18 is formed on the interlayer insulation layer.

The interlayer insulation layer 17 and the protective layer 18 on the drain electrode 10 of the thin-film transistor 30 are selectively removed to form a first contact hole 20, and the gate insulating layer 12, the interlayer insulation layer 17, and the protective layer 18 on the common lines 26 are selectively removed to form a second contact hole 28.

In addition, a pixel electrode 22 and a common electrode 24 are formed on the protective layer 18 of the respective pixel regions.

The pixel electrode 22 is electrically connected to the drain electrode 10 of the thin-film transistor 30 via the first contact hole 20, and the common electrode 24 is electrically connected to the common line 26 via the second contact hole 28.

Here, a situation in which one pixel electrode 22 is formed in each of the pixel regions is shown in the drawings, but the present invention is not limited thereto. The pixel electrode 22 may be formed to have a number of segments having a comb shape. In addition, a situation in which the common electrode 24 having two segments is formed in each of the pixel regions is shown in the drawings, but the present invention is not limited thereto. The common electrode 24 may be formed to have three or more segments, and the segments of the pixel electrode 22 may be arranged between the segments of the common electrode 24.

In addition, the outermost common electrode (i.e., the outermost segment) of the common electrodes 24 has a width larger than a width of the data line 4 to completely cover the corresponding adjacent data line 4.

Therefore, each of the gate lines 2 supplies a gate signal (a scan signal) to the gate electrode 6 of each of the thin-film transistors 30, and each of the data lines 4 supplies a data signal to the pixel electrode 22 via the thin-film transistors 30. Each of the common lines 26 supplies a common voltage to each of the common electrodes 24. As such, when the data signal is supplied to the pixel electrode 22 and the common voltage is supplied to the common electrode 24, a horizontal electric field is formed between the pixel electrode 22 and the common electrode 24 to drive a liquid crystal panel.

In addition, a charge capacitor is formed in each of the pixel regions to charge the data signal applied to the pixel electrode 22 so that the pixel electrode 22 is maintained in a charged state even when the thin-film transistor 30 is turned off.

As such, a first protrusion 31 is formed at a portion of the protective layer 18 in which the gate line 2 and the data line 4 are intersected with each other.

Meanwhile, the color filter array substrate 60 of the liquid crystal display device according to one embodiment of the present invention will be described as follows.

As shown in FIGS. 5 to 8, R, G and B color filter layers 34R, 34G and 34B for realizing colors are formed in each of a plurality of pixel regions on the upper substrate 11 in which the plurality of pixel regions are defined, and an overcoat layer 36 is formed on an entire surface of the upper substrate 11 including the R, G and B color filter layers 34R, 34G and 34B.

In addition, as shown in FIG. 6, the two adjacent color filter layers 34R and 34G, 34G and 34B, or 34R and 34B are stacked on boundaries between the pixel regions, which correspond to the data line 4 of the thin-film transistor array, to overlap each other so as to prevent light leakage. All the three color filter layers 34R, 34G and 34B may also overlap each other. In other words, each color filter layer can be formed as a sheet that includes cut-out regions or holes for the other two pixels (e.g., similar to a lace fabric or a net), and all three color filter layers can be stacked so they overlap portions around the boundaries between each pixel region to form a type of "waffle" structure, in which each of the pixels is centered in the recessed regions of the layered structure (e.g., in the nooks or pockets of the waffle).

Additionally, as shown in FIG. 8, the three color filter layers 34R, 34G and 34B are stacked on the boundaries between the pixel regions, which correspond to the gate line 2 and the common line 26 of the thin-film transistor array, to overlap each other so that the three color filter layers 34R, 34G and 34B are formed to have a second protrusion 39 so as to prevent light leakage and function as a column spacer.

In addition, at least two of the three color filter layers 34R, 34G and 34B are also stacked on an edge region of the color filter array substrate 60 to prevent light leakage. That is, when at least two of the three color filter layers 34R, 34G and 34B are stacked, the red (R) color filter layer 34R and the blue (B) color filter layer 34B may be stacked, and all the three color filter layers 34R, 34G and 34B may also be stacked.

A schematic configuration of the liquid crystal display device in which the thin-film transistor array substrate and the color filter array substrate are bonded to each other as described above will be described as follows.

As shown in FIGS. 4 to 8, the thin-film transistor array substrate 50 includes a gate line 2 formed on the lower substrate 1, a gate electrode 6 protruding from the gate line 2, and a common line 26 formed parallel with the gate line 2.

A gate insulating layer 12 is formed on an entire surface of the lower substrate 1 including the gate line 2, the common line 26, and the gate electrode 6. Also, the gate insulating layer 12 has a contact hole on the common line 26.

An active layer (see reference number 7 of FIG. 10) is formed on the gate insulating layer 12 over the gate electrode 6. A data line 4, a source electrode 8 and a drain electrode 10 are formed on the gate insulating layer 12. The data line 4 is formed in a direction perpendicular to the gate line 2. The source electrode 8 is protruded from the data line 4 toward one side of the active layer. The drain electrode 10 is formed at the other side of the active layer to face the source electrode.

An interlayer insulation layer 17 is formed on an entire surface of the lower substrate 1 including the data line 4 and the source/drain electrode 8 and 10. The interlayer insulation layer 17 has contact holes on the drain electrode 10 and the common line 26. A protective layer 18 is formed on the interlayer insulation layer 17. The protective layer 18 has contact holes on the drain electrode 10 and the common line 26.

Both of the interlayer insulation layer 17 and protective layer 18 have a first contact hole on the drain electrode 10. The gate insulating layer 12, the interlayer insulation layer 17 and protective layer 18 have a second contact hole on the common line 26.

The pixel electrode 22 and the common electrode 24, both of which form a horizontal electric field, are formed on the protective layer 18 of each of the pixel regions.

The pixel electrode 22 is electrically connected to the drain electrode 10 of the thin-film transistor via the first contact hole, and the common electrode 24 is electrically connected to the common line 26 via the second contact hole.

As shown in FIG. 8, the first protrusion 31 functioning as a column spacer is formed at a portion of the protective layer 18 in which the gate line 2 and the data line 4 are intersected with each other.

In addition, third and fourth contact holes are further formed in pad regions of the gate line 2 and the data line 4 by selectively removing the protective layer 18, the interlayer insulation layer 17, and the gate insulating layer 12. Pad electrodes 23 are formed to be coupled to pads of the gate line 2 and the data line 4 via the third and fourth contact holes, respectively. In this instance, the pad electrode 23 is formed of the same material as the pixel electrode 22.

Furthermore, the color filter array substrate 60 of the liquid crystal display device according to one embodiment of the present invention includes R, G and B color filter layers 34R, 34G and 34B in each of a plurality of pixel regions on the upper substrate 11 in which the plurality of pixel regions are defined to realize colors, and an overcoat layer formed on an entire surface of the upper substrate 11 including the R, G and B color filter layers 34R, 34G and 34B, as shown in FIGS. 5 to 8.

As shown in FIG. 6, the two adjacent color filter layers 34R and 34G, 34G and 34B, or 34R and 34B are stacked on boundaries between the pixel regions, which correspond to the data line 4 of the thin-film transistor array, to overlap each other so as to prevent light leakage. All the three color filter layers 34R, 34G and 34B may also overlap each other.

Additionally, as shown in FIG. 7, the three color filter layers 34R, 34G and 34B are stacked on the boundaries between the pixel regions, which correspond to the gate line 2 and the common line 26 of the thin-film transistor array, to overlap each other so that the three color filter layers 34R, 34G and 34B are formed to have a second protrusion 39 so as to prevent light leakage and function as a column spacer.

In addition, at least two of the three color filter layers 34R, 34G and 34B are also stacked on an edge region of the color filter array substrate 60 to prevent light leakage. That is, when at least two of the three color filter layers 34R, 34G and 34B are stacked, the red (R) color filter layer 34R and the blue (B) color filter layer 34B may be stacked, and all the three color filter layers 34R, 34G and 34B may also be stacked.

In addition, the color filter array substrate 60 and the thin-film transistor array substrate 50 are bonded by a seal member to correspond to the first and second protrusions (e.g., 31 and 39), respectively, and a liquid crystal layer 40 is filled between the color filter array substrate 60 and the thin-film transistor array substrate 50.

The method of manufacturing a liquid crystal display device according to one embodiment of the present invention thus configured will be described as follows.

First, a method of manufacturing the color filter array substrate 60 will be described as follows.

FIGS. 9A to 9C are process cross-sectional views illustrating the color filter array substrate 60 of the liquid crystal display device according to one embodiment of the present invention.

As shown in FIG. 9A, an R color filter material including a red pigment is deposited on an entire surface of the upper substrate 11 in which a plurality of red (R), green (G) and blue (B) pixel regions are defined. The R color filter material is selectively etched using a first mask to form an R color filter layer 34R. The R color filter layer 34R is formed on the red pixel region R, a boundary of each of the red pixel regions R, and a region corresponding to the gate line 2 and the common line 26.

That is, the R color filter layers 34R are further formed on regions of the upper substrate 11 which correspond to boundaries between the red pixel regions R and the green pixel regions G and boundaries between the red pixel regions R and blue pixel regions as shown in FIG. 9A, and which correspond to the gate line 2 and the common line 26 as shown in FIG. 7.

Here, the R color filter layers 34R are formed on the upper substrate 11 at an edge region of the color filter array substrate 60 using the first mask to prevent light leakage.

As shown in FIG. 9B, a G color filter material including a green pigment is deposited on an entire surface of the upper substrate 11 including the R color filter layers 34R. The G color filter material is selectively etched using a second mask to form a G color filter layer 34G. The G color filter layer 34G is formed on the green pixel region G, a boundary of each of the green pixel regions G, and a region corresponding to the gate line 2 and the common line 26.

That is, the G color filter layers 34G are further formed on regions of the upper substrate 11 which correspond to boundaries between the green pixel regions G and the red pixel regions R, and boundaries between the green pixel regions G and blue pixel regions B as shown in FIG. 9B, and which correspond to the gate line 2 and the common line 26 as shown in FIG. 7.

Therefore, the R color filter layer 34R and the G color filter layer 34G overlap each other at the boundary between the green pixel region G and the red pixel region R adjacent to the green pixel region G, and the G color filter layer 34G is stacked on the R color filter layer 34R at the region corresponding to the gate line 2 and the common line 26.

Here, the G color filter layers 34G may or may not be formed on the R color filter layers at an edge region of the color filter array substrate 60 using the second mask to prevent light leakage.

As shown in FIG. 9C, a B color filter material including a blue pigment is deposited on an entire surface of the upper substrate 11 including the R color filter layers 34R and the G color filter layers 34G. The B color filter material is selectively etched using a third mask to form a B color filter layer 34B. The B color filter layer 34B is formed on the blue pixel region B, a boundary of the blue pixel regions B, and a region corresponding to the gate line 2 and the common line 26.

That is, the B color filter layers 34B are further formed on regions of the upper substrate 11 which correspond to boundaries between the blue pixel regions B and the red pixel regions R and boundaries between the blue pixel regions B and the green pixel regions G as shown in FIG. 9C, and which correspond to the gate line 2 and the common line 26 as shown in FIG. 7.

Therefore, the blue color filter layer 34B and the R color filter layer 34R overlap each other at the boundary between the blue pixel region B and the red pixel region R adjacent to the blue pixel region B, the blue color filter layer 34B and the G color filter layer 34G overlap each other at the boundary between the blue pixel region B and the green pixel region G adjacent to the blue pixel region B. Also, the R color filter layer 34R, the G color filter layer 34G and the B color filter layer 34B are sequentially stacked on the region corresponding to the gate line 2 and the common line 26 to form a second protrusion 39.

Here, the B color filter layers 34B are formed on the R color filter layers 34R and/or the G color filter layers 34G formed at the edge region of the color filter array substrate 60 using the third mask to prevent light leakage.

In addition, an overcoat layer 36 is formed on entire surface of the upper substrate 11 including the R color filter layers 34R, the G color filter layers 34G and the B color filter layers 34B.

When the color filter array substrate is formed as described above, the color filter array substrate may be formed by using three masks, and the R color filter layer 34R, the G color filter layer 34G and the B color filter layer 34B may be stacked on the region corresponding to the gate line 2 and common line 26 to form the second protrusion 39.

Next, a method of manufacturing the thin-film transistor array substrate 50 will be described as follows.

FIGS. 10A to 10D are process cross-sectional views illustrating the thin-film transistor array substrate 50 of the liquid crystal display device according to one embodiment of the present invention. FIGS. 10A to 10D show a thin-film transistor region A, a region B in which a gate line 2 and a data line 4 overlap to each other, and a pad region C.

As shown in FIG. 10A, a gate line 2, a gate electrode 6 protruding from the gate line, and a common line 26 are formed by depositing a metal layer on a lower substrate 1 and patterning the metal layer using a fourth mask. Thereafter, a gate insulating layer 12 is formed on an entire surface of the lower substrate 1 including the gate line 2, the gate electrode 6, and the common line 26. Then, a semiconductor layer 13 to be used as a thin-film transistor active layer, and a metal layer 14 are sequentially deposited on the gate insulating layer 12.

As shown in FIG. 10B, the semiconductor layer 13 and the metal layer 14 are patterned using a fifth mask as a half-tone mask, to form the thin-film transistor active layer 7 on the gate insulating layer 12 over the gate electrode 6. At the same time, a data line 4 is formed in a direction perpendicular to the gate line 2, a source electrode 8 is formed to protrude from the data line 4 toward one side of the active layer, and a drain electrode 10 is formed on the other side of the active layer to face the source electrode 8.

The half-tone mask has light shielding regions at positions corresponding to the data line 4 and the source and drain electrodes 8 and 10, a half-transmissive region at a position corresponding to a region (a channel region) between the source and drain electrodes 8 and 10, and a transmissive region at the other position.

Therefore, when a photosensitive film is coated on the metal layer 14, the photosensitive film is exposed to light using the half-tone mask, and the exposed photosensitive film is developed, the photosensitive film has a larger thickness at the positions corresponding to the data line 4 and the source and drain electrodes 8 and 10, the photosensitive film has a relatively smaller thickness at the position corresponding to the channel region, and the photosensitive film is removed from the other region.

The semiconductor layer 13 and the metal layer 14 are primarily etched using the patterned photosensitive film. Therefore, the semiconductor layer 13 and the metal layer 14 are remained at the positions corresponding to the data line 4, the source and drain electrodes 8 and 10, and the channel region. Thereafter, as the patterned photosensitive film is ashed to remove a portion of the patterned photosensitive film corresponding to the channel region. A portion of the metal layer corresponding to the channel region is exposed. Then, the portion of the metal layer corresponding to the channel region is secondarily etched using the ashed photosensitive film to form the data line 4, the source and drain electrodes 8 and 10, and the active layer 7. The etching process using the half-tone mask is known in the related art, and thus specific description of the etching process is omitted.

As shown in FIG. 10C, the interlayer insulation layer 17 and the protective layer 18 are sequentially formed on an entire surface of the lower substrate including the data line 4 and the source and drain electrodes 8 and 10. Thereafter, the protective layer 18, the interlayer insulation layer 17 and the gate insulating layer 12 are selectively etched using a sixth mask as a half-tone mask to form a first protrusion 31 and first to fourth contact holes 20, 28, 21 and 22.

The first protrusion 31 is formed on a region, in which the gate line 2 and the data line 4 are intersected with each other, by selectively etching the protective layer 18. The first contact hole 20 is formed by selectively etched the interlayer insulation layer 17 and the protective layer 18 on the drain electrode 10. The second contact hole 28 is formed by selectively etching the interlayer insulation layer 17 and the protective layer 18 on the common line 26. The third contact hole 21 is formed by selectively etching the gate insulating layer 12, the interlayer insulation layer 17, and the protective layer 18 on the a pad portion of the gate line 2. The fourth contact hole 23 is formed by selectively etching the interlayer insulation layer 17 and the protective layer 18 on a pad portion of the data line 4.

Here, the half-tone mask used as the sixth mask has a light shielding region at a position corresponding to the first protrusion 35, transmissive regions at positions corresponding to the first to fourth contact holes 20, 28, 21 and 23, and a half-transmissive region at the other position.

Therefore, when a photosensitive film is coated on the protective layer 18, the photosensitive film is exposed to light using the half-tone mask, and the photosensitive film is developed, the photosensitive film has a larger thickness at the position corresponding to the first protrusion 35 and a relatively smaller thickness at the other position. The photosensitive film is removed at positions corresponding to the first to fourth contact holes 20, 28, 21 and 23.

The protective layer 18, the interlayer insulation layer 17 and the gate insulating layer 12 are primarily etched using the patterned photosensitive film as mask so that the drain electrode 10, the common line 26 and the pad portion of the gate line and the data line are exposed. Therefore, the first to fourth contact holes 20, 28, 21 and 22 are formed. As the patterned photosensitive film is ashed to remove the photosensitive film at the other position, the protective layer 18 at the other position is exposed. Then, the protective layer 18 is secondarily etched in a predetermine depth using the ashed photosensitive film as mask to form the first protrusion 31.

As shown in FIG. 10D, a transparent conductive material (e.g., ITO) or a metal layer is deposited on an entire surface of the protective layer 18. The transparent conductive material (e.g., ITO) or the metal layer is selectively etched using a seventh mask to form a pixel electrode 22, a common electrode 24 and pad electrodes 27 and 28. The pixel electrode 22 is formed on a pixel region of the protective layer 18, and the pixel electrode 22 is electrically connected to the drain electrode 10 via the first contact hole 20. The common electrode 24 is formed on the pixel region of the protective layer 18 and the common electrode 24 is electrically connected to the common line 26 via the second contact hole 28. At the same time, a gate pad electrode 27 and a data pad electrode 28 are formed to electrically connect to the gate line 2 and the data line 4 via the third and fourth contact holes 21 and 23, respectively.

The color filter array substrate 60 and the thin-film transistor array substrate 50 thus configured are bonded by means of a seal member to correspond to the first and second protrusions (31 and 39), respectively, and the liquid crystal layer 40 is filled between the color filter array substrate 60 and the thin-film transistor array substrate 50.

Of course, prior to bonding the color filter array substrate 60 and the thin-film transistor array substrate 50 by means of the seal member, a predetermined amount of liquid crystals may be dropped on the color filter array substrate 60 or the thin-film transistor array substrate 50.

One example of the liquid crystal display device driven in an IPS mode is described in FIGS. 4 to 10D, but the present invention is not limited thereto. For example, the present invention may be applied to all types of liquid crystal display devices in a TN mode and a VA mode.

The liquid crystal display device thus configured, and the method of manufacturing the same according to the embodiments of the present invention has the following effects.

First, light leakage can be prevented by stacking the color filter layers without forming a black matrix layer and a column spacer, the protrusions can be formed respectively on the color filter array substrate and the thin-film transistor array substrate, and thus can function as a column spacer, and processes can be simplified, productivity can be enhanced, and manufacturing costs can be curtailed due to use of seven masks.

Second, since the protrusions are formed respectively on the color filter array substrate and the thin-film transistor array substrate to function as a column spacer, occurrence of scratches on an alignment film in a display region can be prevented, thereby preventing a red-eye effect.

Third, since the protrusions are formed respectively on the color filter array substrate and the thin-film transistor array substrate to function as a column spacer, an amount of liquid crystals used can be reduced due to an increase in volume of specific openings.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a thin-film transistor (TFT) array substrate including:
        a plurality of data lines,
        a plurality of gate lines,
        a plurality of TFTs formed at intersections of the data lines and the gate lines,
        a plurality of common electrodes,
        a plurality of common lines disposed parallel to the plurality of gate lines, and connected to the plurality of common electrodes,
        a protective layer disposed on the plurality of gates lines, the plurality of common lines and the plurality of data lines, and
        a first protrusion protruding from the protective layer; and
    a color filter array substrate including:
        first, second and third color filter layers corresponding to first, second and third sub-pixels, respectively,
    wherein portions of the first, second and third color filer layers overlap each other in an area between two adjacent rows of sub-pixels to form a second protrusion, and the second protrusion overlaps with both one common line among the plurality of common lines and one gate line among the plurality of gate lines that is adjacent to the one common line, and the area between the two adjacent rows of sub-pixels is configured to block light leakage from the corresponding adjacent sub-pixels,
    wherein the second protrusion overlaps with the first protrusion,
    wherein the first, second and third sub-pixels are included in one of the two adjacent rows of sub-pixels, and
    wherein the second protrusion extends along sides of at least three adjacent sub-pixels in the area between the two adjacent rows of sub-pixels.

2. The display device according to claim 1, wherein the first protrusion and the second protrusion together form a column spacer configured to block light leakage and space the TFT array substrate apart from the color filter array substrate, and
    wherein a liquid crystal layer is filled in the space between the TFT array substrate and the color filter array substrate.

3. The display device according to claim 1, wherein the second protrusion includes the first, second and third color filer layers overlapped with each other.

4. The display device according to claim 1, wherein the first, second and third sub-pixels are sequentially disposed adjacent to each other, and the second protrusion extends across the adjacent first, second and third sub-pixels.

5. The display device according to claim 1, wherein each of the first, second and third sub-pixels has a perimeter including four sides, in which two of the four sides overlap with another one of the first, second and third color filter layers, and the other two of the four sides overlap with the two other of the first, second and third color filter layers, and
    wherein the overlapped four sides increase an opaqueness of the perimeter of each of the first, second and third sub-pixels, and a center of each of the first, second and third sub-pixels is less opaque than the perimeter.

6. The display device according to claim 1, wherein two adjacent color filter layers are stacked on boundaries between the sub-pixels, which correspond to one data line among the plurality of data lines, to overlap each other so as to prevent light leakage.

7. The display device according to claim 1, wherein an outermost common electrode among the plurality of common electrodes in each of the first, second and third sub-pixels has a width larger than a width of a corresponding data line and completely covers the corresponding data line.

8. The display device according to claim 1, wherein each of the plurality of gate lines is disposed parallel and adjacent to a corresponding common line among the plurality common lines,
    wherein the plurality of data lines are perpendicular to the plurality of gate lines and the plurality common lines,
    wherein the plurality of common lines are parallel to the plurality of gate lines, and
    wherein the plurality of common electrodes are parallel to and overlap with the plurality of data lines.

9. The display device according to claim 1, further comprising:
    a gate insulating layer disposed on the plurality of gate lines and the plurality of common lines;
    an interlayer insulating layer disposed on the gate insulating layer and between the plurality of data lines and the plurality of common electrodes;
    an overcoat layer disposed on the first, second and third color filter layers; and
    a liquid crystal layer disposed between the protective layer and the overcoat layer,
    wherein the protective layer is disposed on the interlayer insulating layer.

10. A display device comprising:
    a thin-film transistor (TFT) array substrate including:
        a plurality of data lines,
        a plurality of gate lines,
        a plurality of TFTs formed at intersections of the data lines and the gate lines,
        a plurality of common electrodes,
        a plurality of common lines disposed parallel to the plurality of gate lines, and connected to the plurality of common electrodes,
        a protective layer disposed on the plurality of gates lines, the plurality of common lines and the plurality of data lines, and
        a first protrusion protruding from the protective layer; and
    a color filter array substrate including:

first, second and third color filter layers corresponding to first, second and third sub-pixels, respectively, wherein overlapping portions among the first, second and third color filer layers include at least two of the first, second and third color filer layers overlapping with each other, wherein a section of the overlapping portions among the first, second and third color filer layers of the color filter array substrate from a second protrusion, and the second protrusion overlaps with the first protrusion, wherein each of the first, second and third sub-pixels includes a first side that includes two overlapping color filter layers among the first, second and third color filer layers, wherein each of the first, second and third sub-pixels includes a second side that includes three overlapping color filter layers among the first, second and third color filer layers, wherein the second side of each of the first, second and third sub-pixels overlaps with both one common line among the plurality of common lines and one gate line among the plurality of gate lines that is adjacent to the one common line in an area between two adjacent rows of sub-pixels and the area between the two adjacent rows of sub-pixels is configured to block light leakage from the corresponding adjacent sub-pixels, wherein the first, second and third sub-pixels are included in one of the two adjacent rows of sub-pixels, and wherein the second protrusion extends along sides of at least three adjacent sub-pixels in the area between the two adjacent rows of sub-pixels.

11. The display device according to claim 10, wherein the first side of each of the first, second and third sub-pixels is perpendicular to the second side.

12. The display device according to claim 10, wherein each of the first, second and third sub-pixels includes a third side that is opposite to the first side and includes two overlapping color filter layers among the first, second and third color filer layers, and wherein each of the first, second and third sub-pixels includes a fourth side that is opposite to the second side and includes three overlapping color filter layers among the first, second and third color filer layers.

13. The display device according to claim 10, wherein the first protrusion overlaps with an intersection where one data line among the plurality of data lines intersects with one gate line among the plurality of gate lines.

14. The display device according to claim 10, wherein the first protrusion is located at the second side or the fourth side of each the first, second and third sub-pixels and overlaps with the first, second and third color filer layers.

15. The display device according to claim 10, wherein at least one of the first, second and third color filer layers corresponding to one of the first, second and third sub-pixels includes two elongated color filter layer portions that extend across two other sub-pixels among the first, second and third sub-pixels.

16. The display device according to claim 15, wherein the two elongated color filter layer portions overlap with the second and fourth sides of the two other sub-pixels.

17. The display device according to claim 16, wherein at least one of the two elongated color filter layer portions overlaps with the first protrusion and the second protrusion.

18. The display device according to claim 10, wherein the first protrusion and the second protrusion together form a column spacer configured to block light leakage and space the TFT array substrate apart from the color filter array substrate, and wherein a liquid crystal layer is filled in the space between the TFT array substrate and the color filter array substrate.

19. The display device according to claim 1, wherein the first protrusion overlaps with an intersection where one data line among the plurality of data lines perpendicularly intersects with one gate line among the plurality of gate lines.

* * * * *